(No Model.)

2 Sheets—Sheet 1.

W. L. SILVEY.
ELECTRIC MOTOR.

No. 269,888.

Patented Jan. 2, 1883.

WITNESSES:
James B. Ligius.
R. P. Daggett

INVENTOR:
William L. Silvey.

(No Model.)

W. L. SILVEY.
ELECTRIC MOTOR.

No. 269,888.    Patented Jan. 2, 1883.

WITNESSES:
James B. Liggins.
R. P. Daggett.

INVENTOR:
William L. Silvey.

UNITED STATES PATENT OFFICE.

WILLIAM L. SILVEY, OF CASTLETON, INDIANA.

ELECTRIC MOTOR.

SPECIFICATION forming part of Letters Patent No. 269,888, dated January 2, 1883.

Application filed March 18, 1882. (No model.)

*To all whom it may concern:*

Be it known that I, WILLIAM L. SILVEY, residing at Castleton, in the county of Marion and State of Indiana, have invented certain Improvements in Electric Motors, of which the following is a specification.

My invention relates to improvements in that class of electric machines known as "electric motors," in which a continuous current of electricity, when it is generated, may be utilized as a motive power; and it is the object of the present invention to produce a machine that will utilize all or the greatest amount of electromagnetic force produced by the circulation of a continuous current of electricity through an electric conductor and its accessories for the production of motive power, which may be applied to the propulsion of other machinery outside the limits of my present invention.

To attain the object of my invention I have devised an electric motor that is capable of utilizing the following forces: first, the attraction and repulsion of electro-magnets; second, the attraction and repulsion of a coil of wire (through which a current is flowing) toward a magnet; and, third, the attraction and repulsion of two or more coils through which currents are circulating.

Another object of my machine is the proper connections for utilizing the aforesaid forces, and also to reduce my machine to the most compact form to embody my improvements; but I contemplate various changes in the mechanical construction of the apparatus, some of which would very obviously suggest themselves to a skilled electrician on seeing this application and my mode of coiling my wire.

Figure 1:
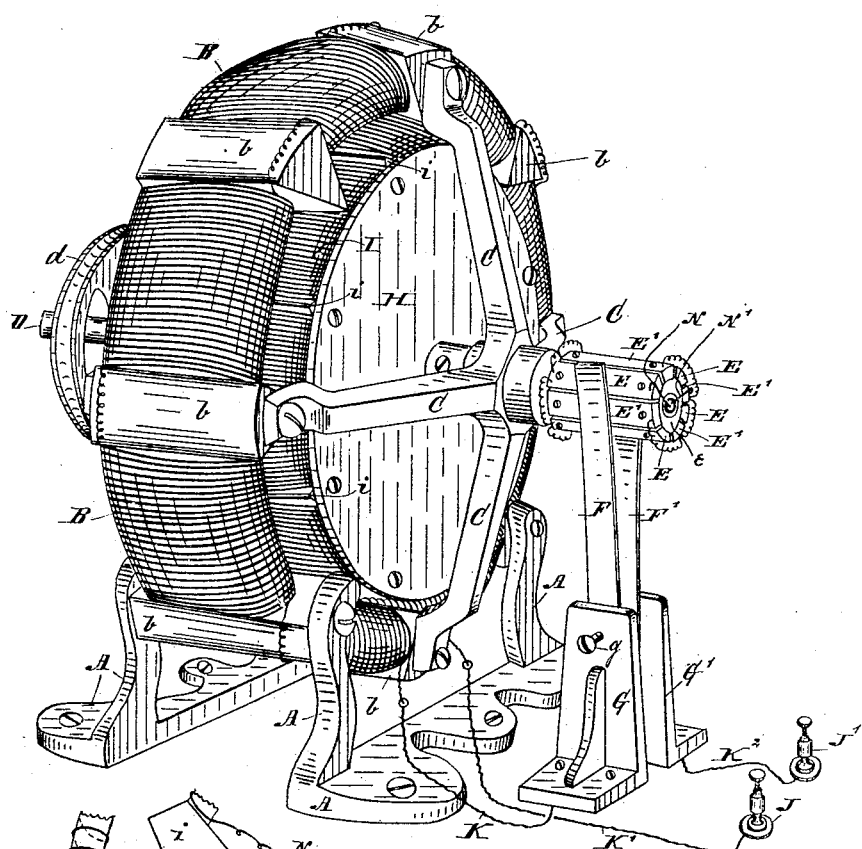
Figure 4:
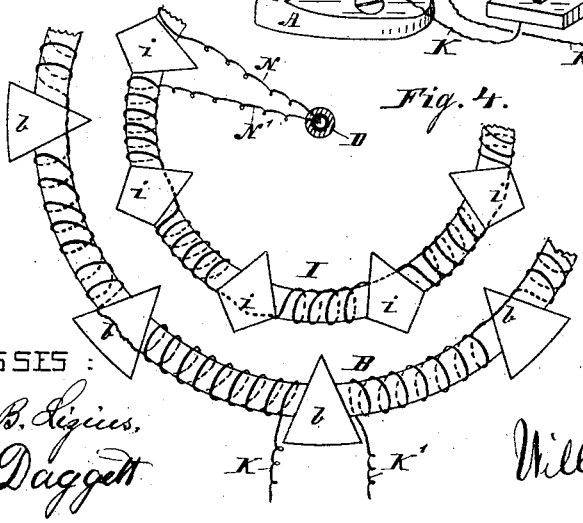
Figure 2:
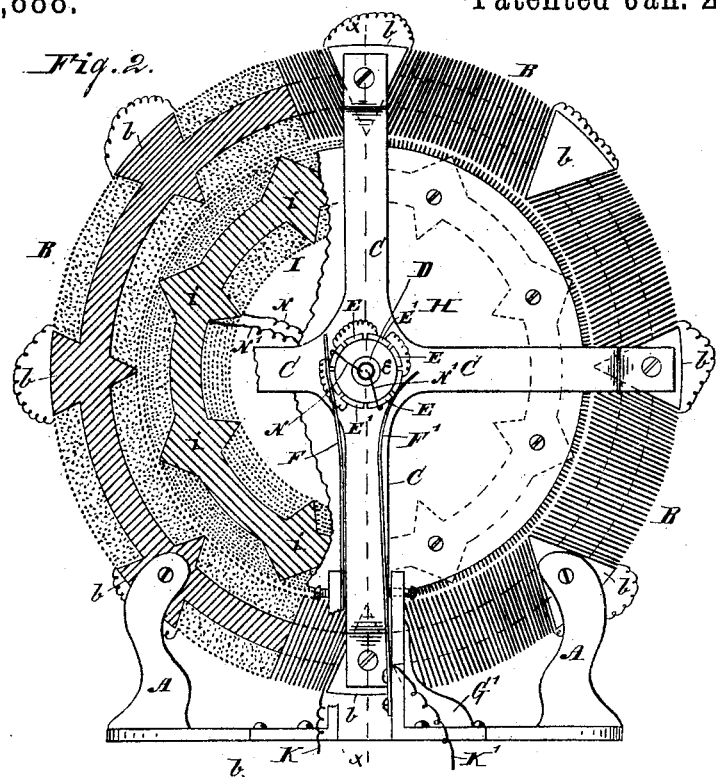
Figure 3:
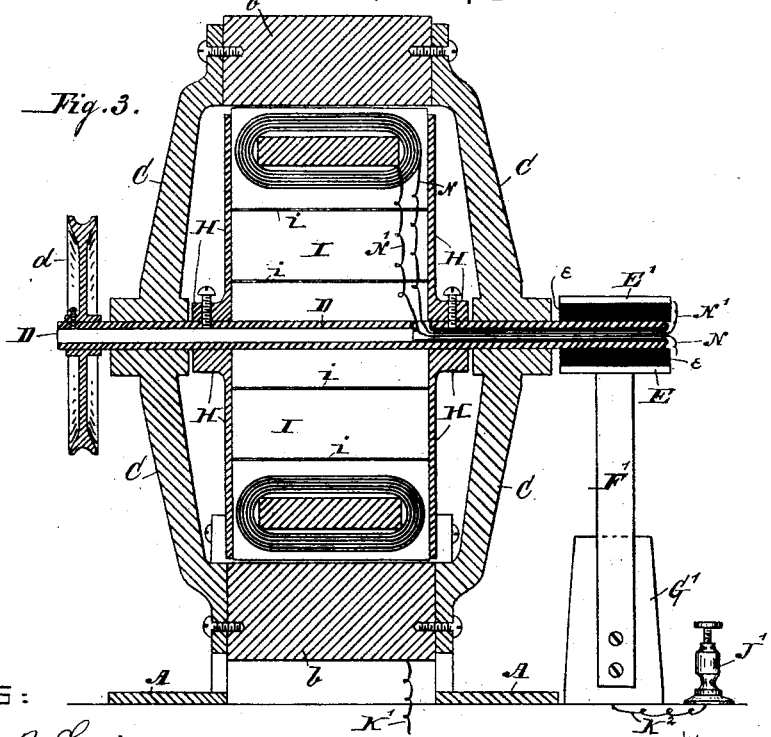

Referring to the accompanying drawings, which are made a part hereof, in which similar letters of reference refer to similar parts throughout, Figure 1 is a perspective plan view of the complete machine. Fig. 2 is an end view, partly in section, looking on the right-hand side of Fig. 1. Fig. 3 is a transverse cross-section of Fig. 2, along the vertical dotted line $x$ $x$; and Fig. 4 shows a plane section view of a part of the field-magnets and part of the armature-magnets, in order to show the manner of winding the wire.

Before entering into a minute description of the mechanical principle of my invention in order to make it clear, it is necessary to enter into a minute description of the underlying electric principle, which all economical electromotors should embrace, and yet it appears that our most efficient electromotors are our most efficient generators—such as the Brush, Gramme, and Siemens machines or dynamo-generators. Taking the dynamo-machine it appears that the most successful are those in which hardened cast-iron forms the cores of the field-magnets, which at all times retain a considerable amount of residual magnetism. This very reasonably suggests to us the necessity of large quantities of residual magnetism in order to start such a machine to action; but when such a machine is converted into an electromotor by the process of inversion, it is obvious that residual magnetism will retard the revolution of the armature, and in so doing a considerable power is lost, for it is a recognized fact that an electromotor in order to be an economical machine must be driven at a high rate of speed.

Another argument adhered to by that class of electricians that hold the dynamo-machine to be the best motor is that the efficiency of an electromotor or the amount of energy to be derived from a given current circulating in its coils bears a direct and definite proportion to the strength or inductive power of its field-magnets and that an increase of power in the field-magnets alone must necessarily produce greater capabilities of the machine. These experimenters seem to forget that the armature bears a certain relation to the field-magnets and while strengthening the field-magnets to an enormous power they leave the armature very light in magnetic power or even the material contained. This increase in power in the field-magnets alone where increase of working power is desired is not only erroneous but hypothetical, as the following data will fully illustrate. Let, for illustration, the north pole of a compass-needle be subjected to the influence of the north pole of a powerful electro-magnet. It will be found that the polarity of the small compass-needle will be permanently reversed and it will be strongly attracted by its overpowering opponent. This same characteristic it is found holds good throughout the whole science of electro-magnetism, that overpowering magnetic influence in magnets is in direct proportion to their developed magnetism.

It is the general characteristic of a considerable number of dynamo-electric machines that during a considerable part of the revolution of the armature each coil is entirely out of circuit, while the remainder of the revolution they move in such relation to the field-magnets that when converted into motors by the process of inversion they can work by the force of attraction only. This plan of attraction only will admit of the power of the field-magnets being considerably exalted over that of the armature, but when it is desirable to work under both the influence of attraction and repulsion it becomes necessary that both the power of the field-magnets and that of the armature be nearly equally balanced, and that in no part of its revolution should the armature be out of action, and also that all the wire in the armature should be contributing its full share in the development of the magnetism of its core.

It is self-evident that any and all efficient electromotors that depend for their action on the known law of attraction and repulsion must necessarily have the field-magnets and the armature-magnets of a nearly equal magnetism, or the greater magnetism of the one will, to a certain extent, overcome or destroy the magnetism of the other, and in so doing retard the action of the machine. Working on this principle, I have constructed a motor in which the power of the field-magnets is as nearly as possible equal to that of the armature, both being constructed of soft-iron, and the result obtained seems to justify the belief that with suitable currents of electricity the most beneficial results may be obtained.

Another very important modification, so often lost sight of in electromotors, is the fact that a motor having many magnets is necessarily more perfect than one having field-magnets of two poles only, and on this plan I have joined my field-magnets as well as my armature-magnets together so as to form complete circles, so that the whole of the revolution of the armature is one of approach or recession from the poles of the field-magnets and the same field-magnets' poles acting the same part toward the armature-magnets' poles.

Still another fact that has come under my notice is that an electro-magnet is much more powerful than a permanent magnet of the same size and weight, when armed with an armature or its equivalent, yet its magnetic influence occupies a much smaller field than a permanent magnet of even a much smaller lifting power. This makes it necessary in my machine that the field of attraction and repulsion be concentrated to the smallest space possible; and it is to embody this very important factor that I have constructed my motor in its present form.

When the dynamo-machine is converted into an electromotor by the process of inversion, in order to become an economical machine, it is deemed necessary to employ two distinct currents of electricity—one for magnetizing the field-magnets and the other for service in the armature-coils. This plan, which has been used with several machines, especially those of the Gramme type, seems erroneous, because it is not reasonable to excite and maintain at all times two separate currents of the same relative power, for while one current is strong the other may become feeble, thereby retarding the efficiency of the machine; but if we use the same current to magnetize both the armature and the field of force a retardation of the magnetism in one will produce a like result in the other, and in this way a constant equilibrium of force is maintained, for while one is feeble it is evident that the other will be feeble, and should either become strong the other will likewise become strong, owing to the free passage of a single current through all the coils of the machine. This important factor becomes apparent in the construction of my motor, as well as the advantage likewise embraced that a coil of wire through which a current of electricity is circulating will act on a magnet passing or in the vicinity of it; also, that two coils will act on each other by the magnetic force of attraction and repulsion, the same as two magnets. By a proper combination I have a machine that utilizes these several forces, or rather modifications, of the same force, while in all others that I am informed about some of these are neglected.

Still another error apparently little noticed until now is that an electromotor in order to be efficient and economical must have its magnets so arranged that during the whole revolution of the armature the motion of the magnets must be one of direct approach or recession from each other, moving on a nearly direct line to or from each other. This can be accomplished in no other way than forming the magnets into an annular ring, in the poles of which polarity may be reversed, and even this ring having many very concentrated poles; but where the field-magnets are composed of two poles only the motions of the poles of the armature are at times at angles of forty-five degrees to one degree from the direct pull. This makes it necessary to so make the field-magnets that they be composed with many poles, and, in order to work by the force of repulsion as well as attraction, composed of a similar number of like poles.

I do not wish to be understood that this machine will not produce an electric current, but rather if we revolve the armature at a speed so that the field-magnets will not discharge their magnetism during the interval between the successive currents from the several electricity-producing coils we will have a very satisfactory dynamo-electric machine. However, I prefer to lay no special claim to this feature, for the reason, as before stated, resulting from the plan of inversion; also, I do not say that a successful electromotor will not produce a dynamo-machine, that in the transmission of electric power from place to place will be unsatisfactory, for if we couple two machines by an electric conductor and revolve one, the other may be made to give out a large percentage of the first power or the electric force created and transmitted. Hence under many circumstances this plan will be found very satisfactory for utilizing the force of waterfalls, wind-power, and the several forces of nature in driving the first machine, which produces the electric current to be transmitted to the other machine more remotely situated, where it is desirable to utilize this force for industrial purposes. Deeming it necessary to point out errors of such machines as have come under my notice, let me say that it was to overcome these obstacles that my machine has assumed its present form, and deeming this preliminary explanation necessary I will now describe the mechanical construction of my electric motor.

The field-magnets constituting the outer ring, B, are mounted on and secured to the supporting-frame and base-plates A A by screws or bolts passing through the leg-like portions of A into the exposed parts of the ring b at the sides, and which exposed parts or wedge-shaped sectors or lugs serve as the poles b of the several magnets that constitute the ring B called the "field-magnets." The four sectors occupying the cardinal positions on the field-magnet ring B serve as the support of the cross-arms C, to which they are secured by screws or bolts. The cross-arms C are all joined together at the center into a projecting hub, through which the revolving axle D passes. This hub on the cross-arms C is made long, so as to give a large bearing-surface and reduce the wear of the hub as well as the axle D to a minimum.

To one end of the axle D the pulley d is secured and to the other end the commutator, consisting of parts e and E E'.

On the inside of the cross-arms C C there is secured to the axle D at each end a web-plate of non-magnetic material, H, having a hub at its center which serves to give the plate a bearing-surface and facilities for securing it to the axle. Around the outer edge are holes drilled in the plate H, for the purpose of securing it to the armature-ring I by screws passing through the holes in the web-plate into the lozenge-shaped projections or pole-pieces i of the armature-ring I.

Instead of the web-plate H there may be substituted spokes or rays converging to a hub or boss; but I prefer to make the plate solid, which prevents the gathering of a current of air in the armature, which by its friction would exert a retarding effect.

The web-plates H H and the armature-ring I form what is known as a "drum," and it is further known that the air contained in all drums that are thrown into revolution becomes rarefied, the air by centrifugal force passing out at the circumference. Hence this machine, since the inside of the armature becomes a partial vacuum, has but very little friction on the inside against reverse currents of air. Should it become necessary to ventilate the armature it may be accomplished by making holes in the web-plates H H near the hub, where a current of air will enter, and by the revolution of the armature be carried by centrifugal force to the circumference, where it is discharged between the coils of wire and the armature-plates H H, and in this way carry away nearly all the heat arising from rapid changes of magnetism.

The commutator consists of two principal parts, one a revolving part secured to the axle and a stationary part secured to the base. The revolving part consists of an insulating part, e, preferably gutta-percha, secured firmly to and revolving with the axle D. Around the circumference of the insulating material e there are secured plates of metal E E', (corresponding in number to the magnets which constitute the armature-ring,) each plate being separated from the others by a small air-space; but each alternate one of these commutators is connected together by a conductor passing round one at each end and joining each alternate plate into one series, the other plates being in another series—that is, one half of the plates are joined onto one terminal wire and the other half onto the other terminal wire, the plates belonging to the two series succeeding each other alternately, and called E and E'.

The number of magnets and commuator-plates it is essential to make of a composite number corresponding to the ratio of 2—as, for instance, 8, 10, 12, 14, 16, 18, &c.—but I prefer to have them in a ratio of 4—as 8, 12, 16, 20, 24, &c.—on account of the greater convenience of securing the cross-arms C C to the magnet-poles b in a perfectly rigid position, and also, should the cross-arms C C be of a magnetic material—as iron or steel—they will all be secured to a magnet pole-piece of a similar polarity. Hence they will not form any cross-magnetic path or path out of the line intended for it to follow. Of course it is to be understood that both the field-magnets and the armature have a similar number of north poles and a similar number of south poles.

By referring to Fig. 1 it will be seen that the metal plates E E' of the commutator are secured to the insulator with their separating-spaces on a line parallel to the axle, and it will be further seen that those marked E refer to one series and those marked E' refer to the other series referred to in an earlier part of this description. These metal plates E E', during their revolution, bear against two springs, F F', on nearly diametrically-opposite sides of the axle. The springs F F' are secured to the two standards G G', through the top part of which pass the screws g, which, although not essential, serves to regulate the pressure between the parts of the commutator. It will be observed that the springs F F' are not exactly straight, but that they are slightly bent near the top. This is done so as to secure the proper electrical connections.

In describing the field-magnets B and the armature I it is necessary to say that they consist of a similar number of pole-pieces and are very nearly alike, except that the armature, being intended to revolve inside the field-magnet ring, must be made to contain the same quantity of magnetism as the field-magnets. This can only be accomplished by winding a similar quantity of wire on both the field-magnets and the armature, other things being equal.

The cores of the field-magnets B consist of a broad annular ring divided into as many sectors $b$ as there are coils to be wound by a number of rectangular grooves or depressions extending longitudinally entirely round the ring, the depth of this groove on every side being a little greater than the thickness of the core, and these grooves or depressions are wound with coils of insulated copper wire until they are filled nearly flush with the intermediate wedge-shaped sectors $b$ or pole-pieces. This will be better illustrated by referring to Fig. 1, which shows an outside perspective view of the full coils; Fig. 2, which shows an end view, partly in perspective and partly in section, fully illustrating every detail, while B in Fig. 4 shows the manner of winding the wire. From this diagram it will be understood that each coil is wound continuously to the others and each alternate coil is wound in an opposite direction. Beginning with terminal wire K the first coil is wound until the depression is full, the wire is then carried to the second depression, which is likewise wound full of wire, but in an opposite direction from the first coil. This process of winding is continued entirely round the ring, each alternate coil being wound in a different direction and the terminal wire of one coil being the commencing end of the one next succeeding it. By this mode of winding two poles of a like polarity are united in each segment $b$ around the entire circle. For illustration, we will say that the sector at the bottom of Fig. 4 is of north polarity, that next succeeding it will be of south polarity, and so on through the entire ring which constitutes the field-magnets, each alternate pole being of a different polarity.

From Fig. 4 it will readily be seen that the inside or armature I is wound exactly like the field-magnet ring B, having two poles of a similar polarity concentrated in each sector $i$, by winding one coil continuously to the other, each alternate coil being wound in an opposite direction. The form of the pole-pieces of the field-magnets $b$ and the pole-pieces of the armature $i$ are fully illustrated. Hence it is useless to say more than that those on the field-magnet ring are of wedge shape, the broad part being outside, while those of the armature are a nearly lozenge shape. This form has been adopted in order to overcome the dead-center occasioned by the passing of one pole before the other, and also for concentrating the magnetic polarity in the smallest space, thereby reducing the obstacles to a minimum, and the amount of power derived is increased to a maximum. In the revolution of the armature I the poles $i$ are so arranged that they will in passing nearly touch the coils of the field-magnets B, and the armature-coils nearly touch the poles $b$ of the field-magnets B, the poles of the armature and those of the field-magnets likewise passing in close proximity. Now, it is a known fact that magnets of a like polarity repel and of unlike polarity attract each other. It is further known that coils of wire may be made to assume all the properties of a magnet by passing a current of electricity through its coils, and two such coils assume all the properties of attraction and repulsion, the same as two magnets. A coil of wire through which a current is flowing will likewise assume toward a magnet all the properties of attraction and repulsion the same as two magnets. All forces seek an equilibrium. Hence in whatever position a magnet is placed it will be attracted by opposite and repelled by similar polarity. Magnets may be made to assume an end-to-end motion, if they are properly mounted, and all of these aforesaid properties will be found combined in the present machine. The current of electricity enters the machine at the binding-post J, passes along the wire, K', enters the field-magnet coils B, passing along the continuous circuit which constitutes the several coils, so called the "field of force," passing thence by wire K to the standard G and the spring F; thence to the commutator-plate E' and the series to which it is connected, consisting of each alternate plate, (all marked E',) thence by the wire N', passing through the axle D to the inside of the web-plate H, and from there to the coils on the armature I, which are wound exactly like the field-magnets, each coil being wound continuously to the next succeeding it, and each alternate coil, is wound in a different direction until all the grooves are full. From the last coil the current escapes by wire N through the center of the insulated axle D to the series of plates on the commutator E, which alternate with the plates E', (all marked E' on the drawings,) belonging to one series, and thence through spring F', standard G', wire K², and binding-post J', returning to the first source.

From the foregoing description it will be seen that the magnetism in the field-magnets first attracts the armature to the unlike poles, and as these armature-magnets revolve they turn the axle carrying the commutator-plates or series of plates E E', so that whenever the poles of the field-magnets and those of the armature come in closest proximity the commutator-plates have revolved so that the current flows in an opposite direction. The polarity being reversed, the magnets repel each other and those farthest away attract. This action and reaction continues during the whole revolution of the armature, the polarity being reversed at every pole, and in this way a continuous revolution is maintained.

Having fully described my invention, what I claim as new, and desire to secure by Letters Patent, is—

1. In an electric motor, the combination of an annular field-magnet, B, having wedge-shaped pole-pieces b and the cross-arms C C secured to them, with an annular armature, I, having diamond-shaped pole-pieces i, with web-plates H H secured to them, the web-plates mounted on the axle D, which passes through the hub of the cross-arms, all being mounted together with the base-plates and legs A A, secured to the pole-pieces of the field-magnets, forming a support for all, as shown and specified.

2. In an electric motor employing a single undivided electric current for generating magnetism in both its field and armature magnets, the combination of an annular ring of field electro-magnets having wedge-shaped pole-pieces with an annular ring of armature electro-magnets having diamond-shaped pole-pieces and a commutator, the coils on both the field-magnet ring and the armature-ring being wound continuously to each other in depressions which extend in a longitudinal direction entirely round them, all the coils on both the field-magnet ring and armature-ring being joined into a single continuous electric circuit by the commutator, as described.

3. In an electric motor, the combination of an external annular field-magnet ring having depressions extending in a longitudinal direction entirely around it, the sectors between the depressions forming pole-pieces, with an internal annular armature-magnet ring having depressions extending in a longitudinal direction entirely around it, the sectors between the depressions forming pole-pieces, and a commutator, the depressions on the field and armature magnets being wound with coils of wire and connected into a single electric circuit by the commutator, a single electric current being employed, with a continuous undivided electric conductor for both the field and armature magnet rings, as described.

4. In an electric motor in which but one undivided electric current is employed for producing all its magnetism, the combination of a commutator with an annular-ring armature and an annular ring of field-magnets on which coils of wire are wound, each alternate coil being wound in a different direction, all the coils of the field and armature magnets being electrically united by the commutator, so as to form a single continuous electric conductor with all the parts arranged to operate as and for the purpose specified.

WILLIAM L. SILVEY.

Witnesses:
  JOHN MOLLENKOPF,
  JOHN SIGMAN.